US011934497B2

(12) United States Patent
Smaiely et al.

(10) Patent No.: US 11,934,497 B2
(45) Date of Patent: *Mar. 19, 2024

(54) CONTENT ANTI-PIRACY MANAGEMENT SYSTEM AND METHOD (71) Applicant: DISH Network L.L.C., Englewood, CO (US)

(72) Inventors: Mohammed Artin Smaiely, Denver, CO (US); Alex Seth Fonoroff, Highlands Ranch, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/174,506

(22) Filed: Feb. 24, 2023

(65) Prior Publication Data

US 2023/0222188 A1 Jul. 13, 2023

Related U.S. Application Data (63) Continuation of application No. 17/139,791, filed on Dec. 31, 2020, now Pat. No. 11,599,604, which is a continuation of application No. 16/030,573, filed on Jul. 9, 2018, now Pat. No. 10,885,159.

(51) Int. Cl.
*G06F 21/16* (2013.01)
*G06Q 20/40* (2012.01)
*H04L 9/06* (2006.01)

(52) U.S. Cl.
CPC ......... *G06F 21/16* (2013.01); *G06Q 20/4037* (2013.01); *H04L 9/0637* (2013.01)

(58) Field of Classification Search
CPC .................................................. G06F 21/16
USPC .................................................... 713/176
See application file for complete search history.

(56) References Cited

U.S. PATENT DOCUMENTS

| 5,835,667 | A | 11/1998 | Wactlar et al. |
| 5,915,250 | A | 6/1999 | Jain et al. |
| 5,953,485 | A | 9/1999 | Abecassis |
| 6,038,601 | A | 3/2000 | Lambert et al. |
| 7,110,984 | B1 * | 9/2006 | Spagna .................... G06F 21/10 705/57 |
| 7,590,866 | B2 * | 9/2009 | Hurtado .................. G06F 21/10 726/28 |
| 8,185,959 | B2 * | 5/2012 | Bellwood ............... G06F 21/10 713/176 |
| 9,058,645 | B1 * | 6/2015 | Corley ............... H04N 21/8358 |
| 9,100,245 | B1 * | 8/2015 | Andrews ............ H04L 63/0876 |
| 10,361,866 | B1 * | 7/2019 | McGregor ............ H04L 9/0637 |
| 10,521,623 | B2 * | 12/2019 | Rodriguez ............ H04L 63/102 |

(Continued)

*Primary Examiner* — Dant B Shaifer Harriman
(74) *Attorney, Agent, or Firm* — Perkins Coie LLP (57) ABSTRACT A software and/or hardware facility that can be used by content owners to assert ownership of content so that copyright friendly websites and services can take action against copyright piracy effectively, efficiently and is scalable is disclosed. The facility makes available to all content owners watermarking/fingerprinting technology so an identifier (e.g., a unique code) can be embedded in the content (e.g., video/audio portion of each video content asset). The facility utilizes blockchain technology to add information related to each unique identifier in a database and allows an authorized user (e.g., the owner) to update the information through a blockchain transaction.

18 Claims, 5 Drawing Sheets

(56) References Cited

U.S. PATENT DOCUMENTS

| | | |
|---|---|---|
| 10,885,159 B2 | 1/2021 | Smaiely et al. |
| 11,550,879 B2 * | 1/2023 | Lev-Ami .............. H04L 51/066 |
| 2004/0133797 A1 * | 7/2004 | Arnold .................... H04L 63/10 |
| | | 713/193 |
| 2008/0249961 A1 * | 10/2008 | Harkness ......... H04N 21/44224 |
| | | 707/999.005 |
| 2009/0037975 A1 * | 2/2009 | Ishikawa ............... G06F 21/105 |
| | | 726/1 |
| 2010/0174608 A1 * | 7/2010 | Harkness ............... G06Q 30/02 |
| | | 726/26 |
| 2014/0058959 A1 * | 2/2014 | Isbjornssund ........... G06F 21/10 |
| | | 705/310 |
| 2016/0232534 A1 * | 8/2016 | Lacey .............. G06Q 20/38215 |
| 2017/0142076 A1 * | 5/2017 | Ford ..................... H04L 63/083 |
| 2019/0180291 A1 * | 6/2019 | Schmeling ............. G16H 20/10 |
| 2019/0318348 A1 * | 10/2019 | Brenner ................ G06Q 50/184 |
| 2020/0012765 A1 * | 1/2020 | Smaiely ................. H04L 9/50 |
| 2020/0012806 A1 * | 1/2020 | Bates ................. G06F 3/04842 |
| 2020/0074059 A1 * | 3/2020 | Beckett, Jr. ............. G06F 21/36 |
| 2020/0159889 A1 * | 5/2020 | Chui ..................... G06F 21/105 |
| 2020/0159890 A1 * | 5/2020 | Chui .................... G06F 21/128 |
| 2021/0150003 A1 | 5/2021 | Smaiely et al. |
| 2021/0248214 A1 * | 8/2021 | Goldston ................ G06F 21/16 |
| 2021/0256070 A1 * | 8/2021 | Tran .................. G06F 16/90332 |
| 2021/0279305 A1 * | 9/2021 | Goldston ................ G06F 16/61 |
| 2021/0409489 A1 * | 12/2021 | Speasl ................... H04L 67/104 |
| 2022/0021728 A1 * | 1/2022 | Kelly ..................... H04L 67/06 |
| 2022/0210061 A1 * | 6/2022 | Simu ..................... G06N 5/01 |
| 2022/0215075 A1 * | 7/2022 | Goldston ............... G06F 3/0481 |

\* cited by examiner

| Content ID 310 | Content Description 315 | Content Type 320 | Content Hash Value 325 | Creation Timestamp 330 |
|---|---|---|---|---|
| 123456 | Cat video | Video | e0d123e5f316bef78bfdf5a008837 | April 1, 1990 @ 0600 |
| 45978 | To Kill a Mocking Bird | Book | cc273fe9d442850fa18c31c88c823 | Jan. 31, 2000 @ 1600 |
| ⋮ | ⋮ | ⋮ | ⋮ | ⋮ |

| Content ID 345 | Digital Content Provider ID 350 | User ID 355 | User Role 360 | Role Creation Timestamp 365 | Role Expiry Timestamp 370 |
|---|---|---|---|---|---|
| 123456 | 4567 | 492 | Creator | April 11, 1990 @ 0600 | ----- |
| 123456 | 2391 | 10897 | Subscriber | Jan. 1, 1997 @ 1600 | Jan. 1, 2002 @ 1600 |
| 123456 | 4567 | 10897 | Subscriber | June 6, 1996 @ 1500 | Dec. 31, 1997 @ 1400 |
| 123456 | 560 | 492 | Creator | Jan. 25, 2015 @ 0730 | ----- |
| ⋮ | ⋮ | ⋮ | ⋮ | ⋮ | ⋮ |

CONTENT ANTI-PIRACY MANAGEMENT SYSTEM AND METHOD

CROSS-REFERENCE TO RELATED APPLICATIONS

This application is a continuation of U.S. patent application Ser. No. 17/139,791, filed Dec. 31, 2020, entitled "CONTENT ANTI-PIRACY MANAGEMENT SYSTEM AND METHOD," which is a continuation of U.S. patent application Ser. No. 16/030,573, filed Jul. 9, 2018, entitled "CONTENT ANTI-PIRACY MANAGEMENT SYSTEM AND METHOD," now U.S. Pat. No. 10,885,159, the entire disclosure of which is hereby incorporated by reference for all purposes.

BACKGROUND

Over the past five years content piracy has dramatically disrupted the media industry on a global scale and the decentralized nature is increasingly becoming more complex and difficult to manage and monitor. The distribution of infringed material on content sharing platforms such as Facebook and YouTube have grown rapidly. For example, viewers can easily find links to live sporting events, hosted on someone's Facebook account, find the newest episodes of their favorite series on YouTube or Dailymotion or even join groups like 'mobile movies' on Telegram (messaging app) and/or download compressed video files of the newest Hollywood blockbusters onto their phones and cast to their Smart TVs.

As the video sharing community expands and more and more content is shared online, monitoring and managing content sharing to prevent piracy is expected to become a difficult undertaking as re-transmission technologies evolve and other services like Snap Chat, Periscope, WhatsApp, Youku, etc. become significant distribution platforms with millions of followers globally and used by thousands of pirates to re-broadcast copyrighted material. In addition, millennials and the next generation are breaking apart from the traditional bundle service system and are opting in for cheaper or free alternative services; their value-system of content consumption is different than the previous generations.

While anti-piracy organizations and vendors are equipped with the appropriate technologies to take down copyright infringed materials, the overall process faces several limitations. For example, in the absence of watermarking, content owners must continually search for potential unauthorized use of their content, which is inefficient and generally by the time the content is removed it has already been seen by millions of viewers globally. On the other hand, current watermarking/fingerprinting technologies are difficult to implement and generally requires the use of extensive computing resources. Further, current watermarking/fingerprinting technologies (e.g., YouTube's content ID system) are platform specific and are not available and/or adaptable across platforms, thus severely limiting their applicability and usability. Existing technologies also suffer from a lack of standardization, further exasperating the problem of cross-platform usability. Further, existing technologies require the content to first be uploaded to a platform before it can be watermarked/fingerprinted. This consumes significant resources including time and money, and is overall unwieldy. Moreover, content owners typically need to hire attorneys to properly register the content and/or send cease and desist letters on their behalf, which is costly.

Existing technologies are frequently expensive because they involve intermediaries that charge high fees for their services. Existing techniques are inefficient due to delays in executing required steps to register the content, duplications of work and lack of clarity of content ownership by territory. They are also vulnerable because if a central system is compromised, due to fraud, cyberattack, or a simple mistake, the entire business network is affected.

DETAILED DESCRIPTION

As outlined above, traditional anti-piracy technologies to the fast-changing and growing decentralized content sharing industry are becoming archaic in containing content piracy. With many different anti-piracy methods, a reformulation is needed that minimizes divergent approaches and unifies participants on a common protocol.

Accordingly, the inventors have conceived and reduced to practice a software and/or hardware facility that can be used by content owners to assert ownership of content so that copyright friendly websites and services can take action against copyright piracy effectively, efficiently and is scalable. ("the facility"). The facility provides a blockchain-powered network that is both economical and efficient because it eliminates duplication of efforts and reduces the need for intermediaries. The facility gives participants the ability to share a ledger that is constantly updated and every time a transaction occurs. Each participant in the network acts as both a publisher and a subscriber and the data is synchronized across the network as it is transferred. The facility provides a solution that is also less vulnerable because transactions can be verified and committed to the ledger through various consensus models to validate information; this process ensures clarity of content ownership. Transactions are secure, authenticated, and verifiable.

The facility makes available to all content owners watermarking/fingerprinting technology so an identifier (e.g., a unique code) can be embedded in the content (e.g., video/audio portion of each video content asset). The facility utilizes blockchain technology to add information related to each unique identifier in a database and allows an authorized user (e.g., the owner) to update the information through a blockchain transaction. Examples of information include, but are not limited to identity of authorized users, contact information (e.g., e-mail, telephone number or any other details that other platforms use to identify user account), current rightsholder(s) (e.g., editor, user, subscriber, distributer, etc.), sublicensee who has the rights to sublicense to another party, markets (U.S., Germany, Japan, etc.), language rights, etc. The facility provides identity verifier software that can be used by a content sharing platform/service to read a unique identifier (e.g., #1010101012) used in their service and query the facility's blockchain repository to read the data related to that unique identifier. Once the content sharing platform/service identifies that content is re-broadcasted with no permission on an online content provider's page, the facility provides a variety of options to act against the infringer or unauthorized content. For example, the facility enables the content sharing platform/service to sequester the content for limited period, notify the owner of the content, takedown the content, etc.

The facility connects and unifies participants—creators, content owners, distributors and other network participants—across the world and standardizes the anti-piracy protocol. It eliminates the cost of complexity and redefines the traditional boundaries of the anti-piracy industry. On a high level, one or more of the following participants interact with the facility: blockchain users (participant with permission to join the blockchain network and conduct the transaction), blockchain developer (programmer who creates applications that enable blockchain users to conduct transactions in the network), digital content providers (platform/service that receives content from participants and uploads to one or more content servers), wallet provider (service that registers participants and generates the initial transaction), and a currency exchange platform to convert hard and digital currencies (e.g., tokens).

The facility improves existing content sharing technologies by providing a consensus based solution where all participants must agree on a transaction's validity before the transaction can be deemed valid. Participants can also easily identify the origin of a content asset and track its ownership (e.g., how the ownership has changed over time). Further, the facility ensures that participants cannot tamper with a transaction after it has been recorded to the ledger. If a transaction is in error, a new transaction must be used to reverse the error and both transactions are then visible. A single, shared ledger provides one place to go to determine the ownership of an asset or the completion of a transaction. The facility is easily accessible from any geographic location and is powered by participants from around the world; it is not dependent on one set of networks or entity. The facility provides these and other benefits over existing content sharing technologies to prevent piracy of content.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to passive privacy breach notifications, embodiments of the present technology are equally applicable creating additional notifications in response to various triggering events.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CDROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in several embodiments," "in some embodiments," "according to several embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1A:
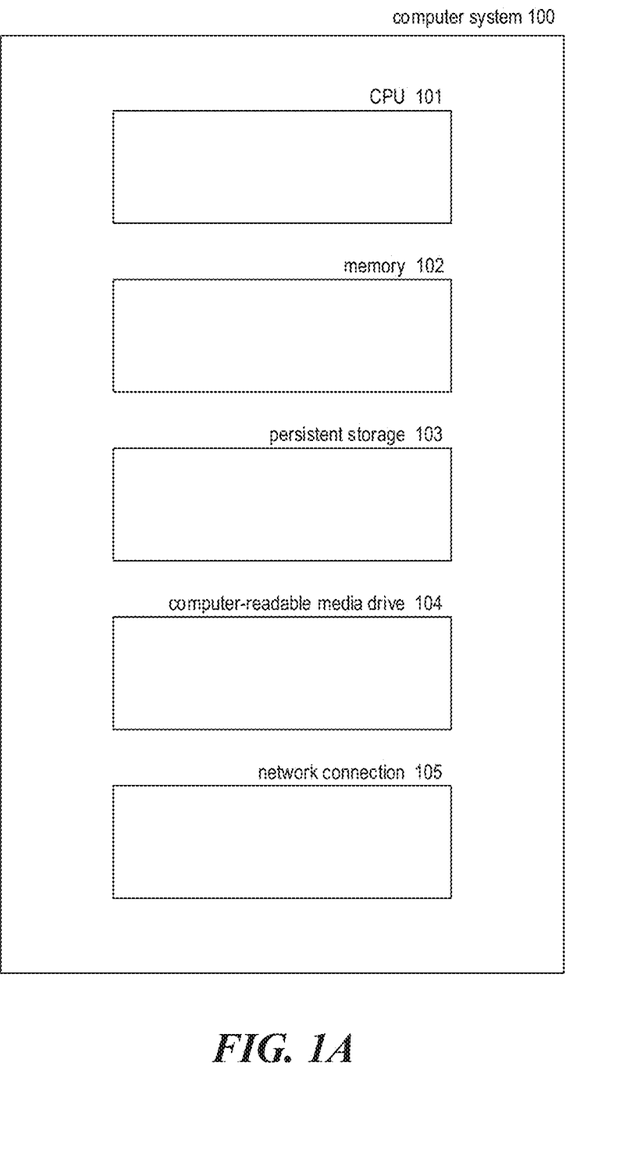
FIG. 1A is a block diagram showing some of the components typically incorporated in at least some of the computer systems and other devices on which the facility operates.

FIG. 1A is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 1B:
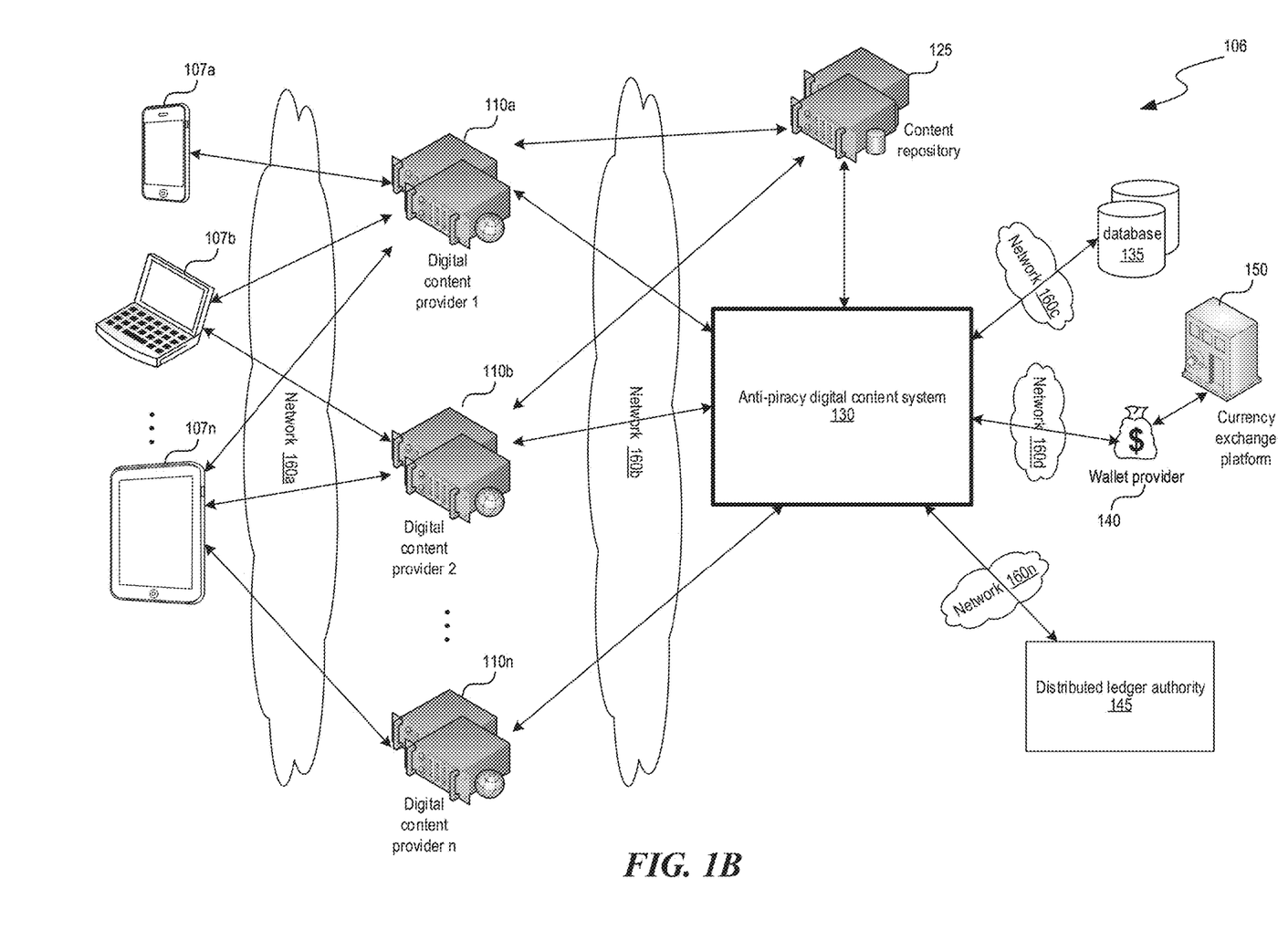
FIG. 1B illustrates an example of a communications environment in which some embodiments of the facility can be utilized.

FIG. 1B illustrates an example of a communications environment 106 in which some embodiments of the facility can be utilized. In various embodiments, environment 106 comprises several digital content providers 110a, 110b, . . . , 110n (e.g., Youtube, Facebook, Vimeo, Scribd, etc.). Users can use various electronic devices (e.g., mobile device 107a, laptop/PC 107b, . . . , tablet 107n) to initiate a transaction for uploading digital media content to one or more of the digital content providers 110a, 110b, . . . , 110n via a communications network 160a, such as a Local Area Network ("LAN"), Wide Area Network ("WAN"), the Internet, and the like. Examples of digital media content include, but are not limited to audio, video, text, and image. The digital content providers 110a, 110b, . . . , 110n can store the received digital media content in one or more content repositories 125 via a communications network 160b.

In several embodiments, content upload transactions use identity tokens, which are also referred to as digital bearer bonds, to uniquely identify the digital content that can be owned. An identity token or identifier for the digital content can be generated using a cryptographic one-way hash of information that uniquely identifies the digital content. Tokens also have an owner that uses an additional public/private key pair. The owner public key can be set as the token owner identity and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). Digital content (e.g., a book) can be uniquely identified, for example, using the name of its author and its International Standard Book Number (ISBN). The identity tokens for each can be a cryptographic one-way hash of such combinations. The identity token for an entity (e.g., person or company) may be the public key of a public/private key pair, where the private key is held by the entity. Identity tokens can be used to identify people, institutions, digital content, contracts, computer code, and so on. Identity tokens can also be used to identify collections of digital content. An identity token for a collection may be a cryptographic one-way hash of the digital tokens of the digital content assets in the collection. The creation of an identity token for an asset in a blockchain establishes provenance of the asset, and the identity token can be used in transactions (e.g., uploading, editing, distributing) of the digital content asset stored in a blockchain, creating a full audit trail of the transactions.

In several embodiments, the digital content provider examines the received digital media content to determine if it includes (e.g., as a watermark or a fingerprint) at least one content-specific identifier. Examples of content-specific identifiers include, but are not limited to alphanumeric string, pattern of bit, audio pattern, video pattern, etc. The content-specific identifier can uniquely identify the digital content. When a digital content provider (e.g., 110a) receives digital media content for upload, it can communicate with an anti-piracy digital content system 130 via network 160b to verify that the user uploading the content is authorized to do so. For example, the digital content provider can transmit at least part of the received digital media content, the retrieved content-specific identifier and/or information about the upload user to the anti-piracy digital content system 130. In several embodiments, the anti-piracy digital content system 130 examines the received digital media content to determine if it includes (e.g., as a watermark or a fingerprint) at least one content-specific identifier. The anti-piracy digital content system 130 can then communicate with one or more data storage repositories 135 via network 160c and/or the distributed ledger authority 145 via network 160n to verify that the upload user has the appropriate permissions to upload the digital media content. The data storage repositories 135 can store information including, but not limited to content identifier, content description, content type, hash value of the content, creation time, user information (e.g., user identifier, roles, permissions, etc.), encryption key(s), digital content provider information (e.g., provider identifier, name, affiliates, priority, etc.), etc.

With a distributed ledger managed and monitored by the distributed ledger authority 145, a ledger of all the transactions for a digital content is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The anti-piracy digital content system 130 (and/or the distributed ledger authority 145) also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The anti-piracy digital content system 130 (and/or the distributed ledger authority 145) also implements techniques to ensure that it would be infeasible to change a transaction and regenerate the blockchain by employing a computationally expensive technique to generate a nonce that is added to the block when it is created.

The anti-piracy digital content system 130 can also communicate with a digital wallet provider 140 via network 160d to verify that the upload user has sufficient funds (e.g., credit, tokens, etc.) to upload the digital media content to the digital media content provider. For example, when the digital media content does not include a content-specific identifier, the anti-piracy digital content system 130 can communicate with the digital wallet provider 140 to check a current balance of the upload user. When the upload user does not have sufficient funds to upload the digital media content, the wallet provider 140 can communicate with a currency exchange platform (e.g., a bank, a digital currency provider, a credit-card authority, etc.) to enable the upload user to add funds to their digital wallet account.

The anti-piracy digital content system 130 can also communicate with a distributed ledger authority 145 via network 160n to provision a content-specific identifier for the digital media content. The content-specific identifier can be based on a type (e.g., video, audio, text, image, etc.) of the digital media content, the digital media content provider to which the content is being uploaded, location of the upload user, location of the digital content provider, etc. For example, the anti-piracy digital content system 130 can provision a range of content-specific identifiers for each digital media content provider (e.g., identifiers 0100000-0199999 for digital content provider 1, identifiers 0200000-0299999 for digital content provider 2, etc.). The anti-piracy digital content system 130 can provision these content-specific identifiers when a new digital content provider registers with the anti-piracy digital content system 130. Similarly, the anti-piracy digital content system 130 can provision a range of content-specific identifiers for each content type (e.g., identifiers 01XXXXX for video, identifiers 02XXXXX for audio, identifiers 03XXXXX for text, identifiers 04XXXXX for images, etc.). When the anti-piracy digital content system 130 receives a request from a digital content provider to associate digital media content with a unique content-specific identifier, it can select an identifier from a range reserved for that digital content provider and/or type of content. In several embodiments, the anti-piracy digital content system 130 can request a content-specific identifier from the distributed ledger authority 145 upon receiving the digital content for upload.

Upon associating digital media content with a new content-specific identifier, the anti-piracy digital content system 130 communicates with the distributed ledger authority 145 to transmit this association information. In several embodiments, whenever the anti-piracy digital content system 130 detects a change in information associated with digital media content, it communicates with the distributed ledger authority 145 to update the information maintained therein.

For example, when a new user is associated with digital media content that was previously associated with at least one content-specific identifier, the anti-piracy digital content system 130 can communicate with the distributed ledger authority to reflect this update (e.g., by adding an entry in the distributed ledger).

Figure 3A:
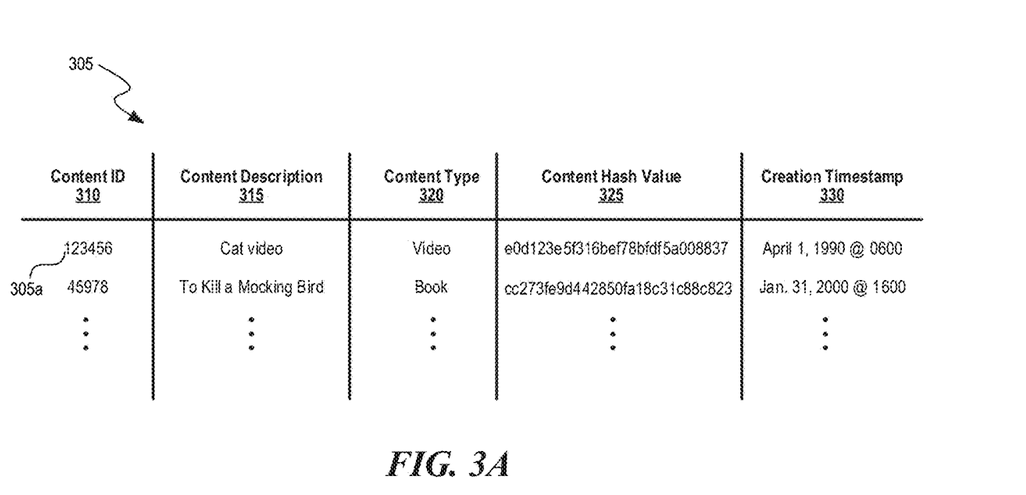
FIG. 3A is an exemplary data structure showing contents of a distributed ledger for maintaining information about digital content.
Figure 3B:
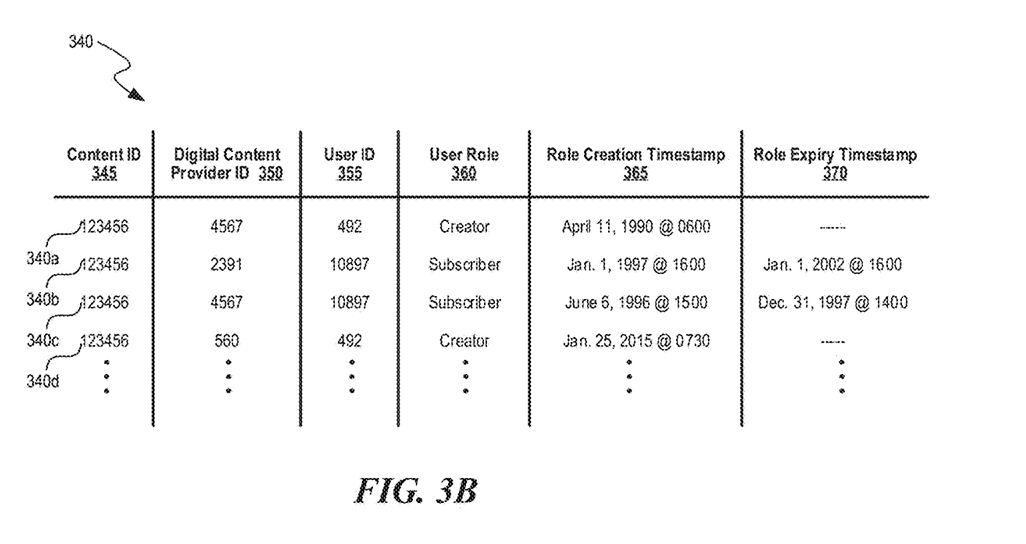
FIG. 3B is an exemplary data structure showing contents of a distributed ledger for maintaining information about rights in digital content.

FIGS. 3A and 3B illustrate exemplary data structures showing contents of a distributed ledger for maintaining information about digital contents and any rights therein. For example, FIG. 3A is an exemplary data structure 305 showing contents of a distributed ledger for maintaining one or more of the following information about digital content: content identifier 310, content description 315, content type 320, hash (and/or encrypted) value of content 325, content creation time 330. For example, data structure 305 includes an entry 305 for digital content of a type video titled "Cat video." FIG. 3B is an exemplary data structure showing contents of a distributed ledger for maintaining the following information about rights in digital content: content identifier 345 (e.g., as a foreign key to the content identifier in data structure 305), digital content provider identifier 350, user identifier 355, user role 360 (e.g., creator, owner, subscriber, editor, distributor, etc.), role creation timestamp 365, and role expiry timestamp 370. For example, data structure 340 includes three entries for digital content associated with content identifier 123456. The first entry 340a corresponds to the digital content uploaded via digital content provider 4567 with user 492 with a "creator" role. The second entry 340b corresponds to the digital content uploaded via digital content provider 2391 with user 10897 with a "subscriber" role. The third entry 340c corresponds to the digital content uploaded via digital content provider 4567 with user 10897 with a "subscriber" role. The fourth entry 340d corresponds to the digital content uploaded via digital content provider 560 with user 492 with a "creator" role.

Figure 2A:
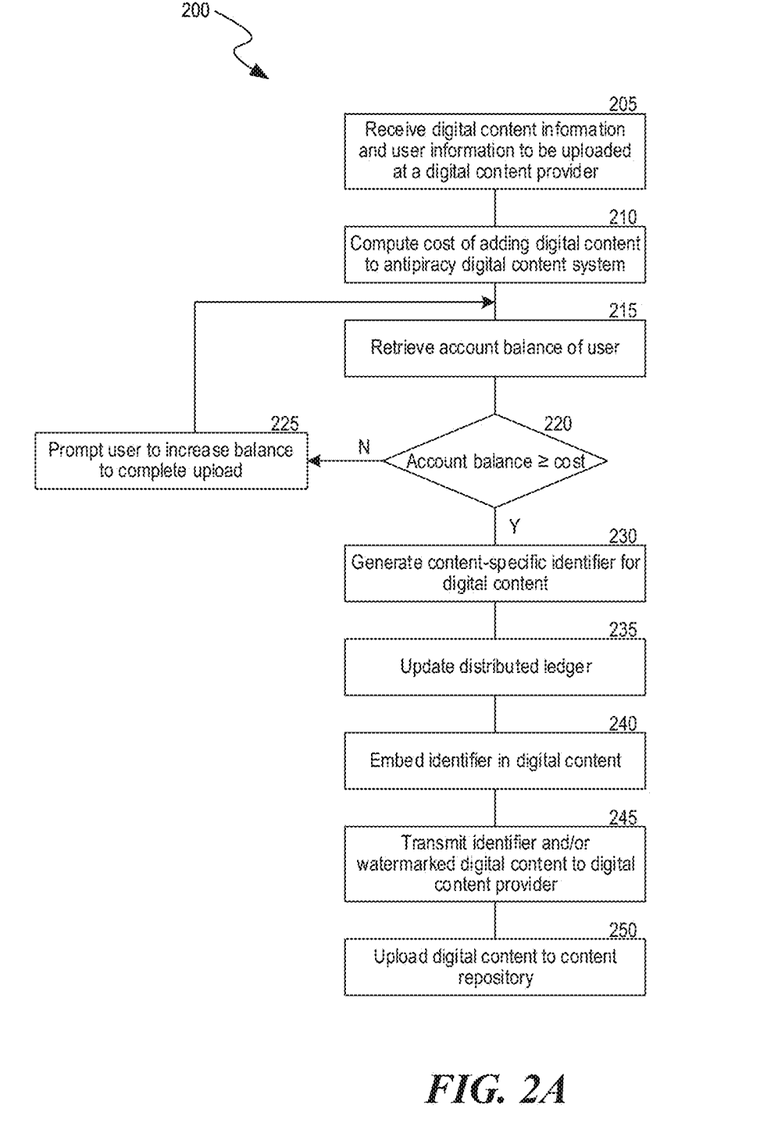
FIG. 2A is a flow diagram showing a process performed by the facility in some embodiments when receiving new content for uploading.

FIG. 2A is a flow diagram showing a process 200 performed by the facility in some embodiments when receiving new content for uploading. Process 200 begins at block 205 by receiving information about digital content to be uploaded at a digital content provider. For example, an uploading user can access a content upload page hosted by a digital content provider (e.g., Youtube) and submit digital content for upload. Information about the digital content includes, for example, content identifier, content type, size, hash value of the content, encrypted content, date of creation, date of upload, creator, owner, etc. In addition to the information about the digital content to be uploaded, process 200 can receive information about the digital content provider via which the content is to be uploaded (e.g., content provider identifier, name, location, affiliates, etc.) as well as information about the uploading user (e.g., user identifier, name, location, affiliates, role, etc.).

Upon receiving the digital content, at block 210 process 200 computes a cost associated with adding at least a portion of the received digital content via the anti-piracy digital content system so that the content is available and accessible by other users. In several embodiments, process 200 computes the cost based on one or more of the following parameters: type of content, size of content, identity of digital content provider, identity of uploading user, role of uploading user, type of user rights associated with content, location of digital content provider, location of uploading user, etc. For example, based on the identity of the digital content provider and type of content, process 200 can compute a discounted cost of uploading the content. At block 215, process 200 retrieves a current account balance associated with the uploading user. For example, process 200 can identify the uploading user based on the received information about the uploading user and then access the digital wallet provider 140 (FIG. 1B) to retrieve a current account balance of the identified user. An account balance can be represented in one or more of the following forms: dollar amount, credits, tokens, digital currency, etc.

When the user's account does not have sufficient funds to upload the digital content (i.e., user's account balance is less than the computed cost associated with adding at least a portion of the received digital content), process 200 proceeds to block 225 and transmits a notification to the uploading user (e.g., via the digital content provider at which the uploading user is attempting to upload the digital content) of insufficient funds. In several embodiments, process 200 computes different costs for uploading different portions of the digital content. For example, for video content, process 200 can compute a first cost for uploading a preview of the video content, a second cost for uploading a first portion of the video content, and a third cost for uploading the remaining portion(s) of the video content. In several embodiments, if an auto-upload or auto-payment option is selected for a user account, process 200 can automatically update the user's account balance so that it contains sufficient funds to cover the cost of uploading the digital content.

When the user's account has sufficient funds to upload the digital content (i.e., user's account balance is greater than or equal to the computed cost associated with adding at least a portion of the received digital content), process 200 proceeds to block 230 where it generates/obtains at least one content-specific identifier for the digital content. Examples of content-specific identifiers include, but are not limited to alphanumeric string, pattern of bit, audio pattern, video pattern, etc. The content-specific identifier can uniquely identify the digital content. The content-specific identifier can be based on a type (e.g., video, audio, text, image, etc.) of the digital media content, the digital media content provider to which the content is being uploaded, etc. In several embodiments, process 200 can obtain the content-specific identifier from a distributed ledger authority (e.g., distributed ledger authority 145 shown in FIG. 1B).

At block 235, process 200 updates the distributed ledger authority with information associating the content-specific identifier and the digital content. For example, process 200 can transmit information to the distributed ledger authority to add/update entries in the contents ledger table (FIG. 3A) and the content rights table (FIG. 3B) to reflect the newly provisioned content-specific identifier and its associated digital content and user information. After obtaining at least one content-specific identifier for the digital content, at block 240 process 200 embeds (e.g., as a watermark/fingerprint), the obtained content-specific identifier(s) in the digital content. In several embodiments, process 200 transmits the at least one content-specific identifier to the digital content provider which in turn embeds the obtained content-specific identifier(s) in the digital content. In several embodiments, the obtained content-specific identifier(s) is encrypted prior to inserting it in the digital content. At block 245, process 200 transmits the obtained content-specific identifier(s), the digital content including the content-specific identifier(s), or both to the digital content provider. At block 250, process 200 uploads the digital content to the content repository (e.g., content repository 125 in FIG. 1B).

Figure 2B:
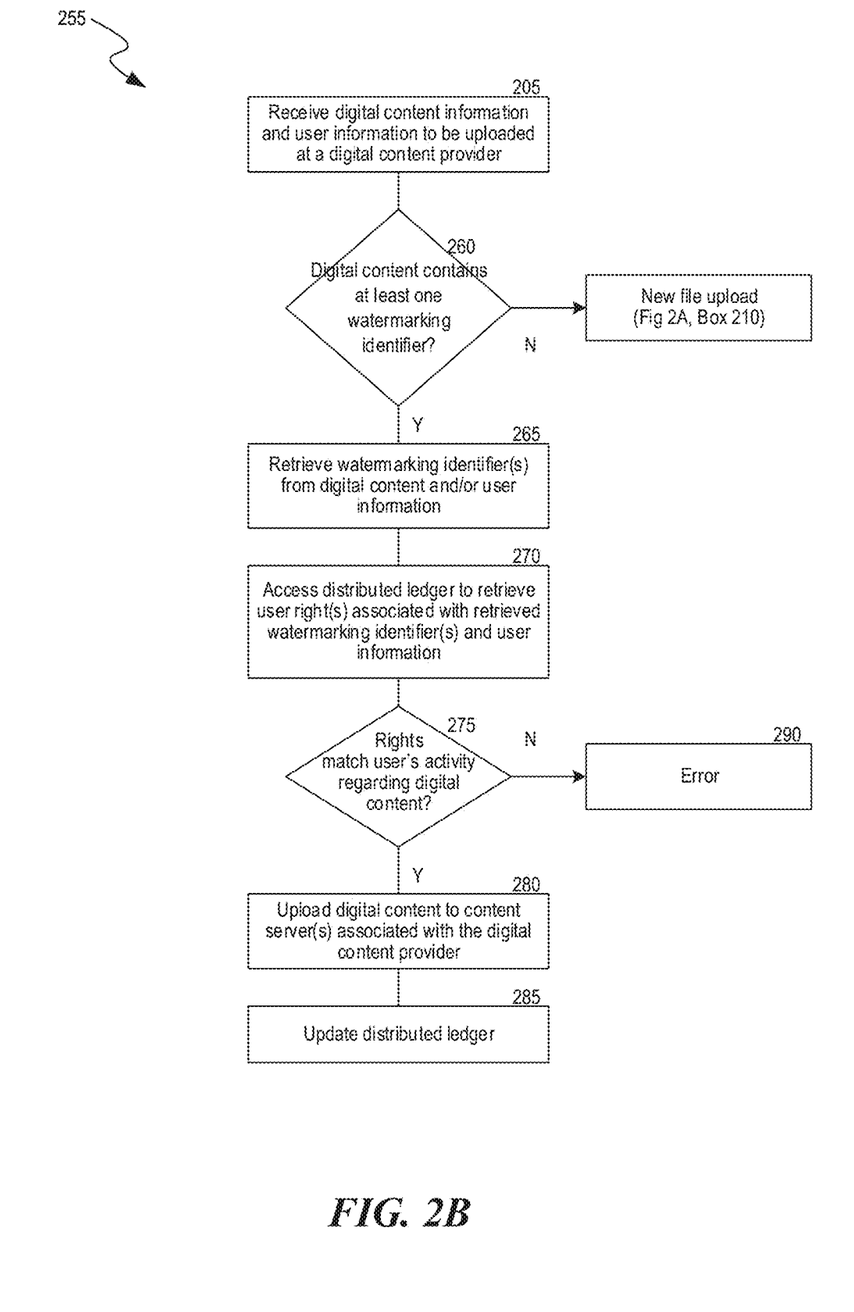
FIG. 2B is a flow diagram showing a process performed by the facility in some embodiments when receiving content for uploading.

FIG. 2B is a flow diagram showing a process 255 performed by the facility in some embodiments when receiving content for uploading. Process 200 begins at block 205 (similar to that discussed above in reference to FIG. 2A) by receiving information about digital content to be uploaded at a digital content provider. At block 260, process 255 examines the digital content to be uploaded to determine whether it includes at least one content-specific watermarking identifier. When process 255 determines that the digital content does not include a content-specific watermarking identifier, it proceeds to the process of uploading new content to the digital content provider (block 210 discussed above in reference to FIG. 2A).

When process 255 determines that the digital content includes at least one content-specific watermarking identifier, it proceeds to block 265. At block 265, process 255 retrieves the content-specific watermarking identifier(s) and/or information of the uploading user. For example, the facility enables a user to upload previously watermarked digital content to a different digital content provider. As an example, a user (with the appropriate user role and permissions) uploads a first digital content to a first digital content provider (e.g., Youtube). The same user (or even a different user with the appropriate user role and permissions) can then upload the same first digital content to a second digital content provider (e.g., Facebook). When the user attempts to upload the first digital content to the second digital content provider, the first digital content will include at least one content-specific watermarking identifier, which process 255 will identify upon examination.

Process 255 proceeds to block 270 where it accesses a distributed ledger authority (e.g., distributed ledger authority 145 shown in FIG. 1B) to obtain one or more digital rights entities (e.g., from data structures illustrated in FIGS. 3A and 3B) associated with the content-specific watermarking identifier(s). For example, for digital content associated with content identifier 123456, process 255 retrieves three digital rights entities (FIG. 3B, 340a, 340b, 340c, and 340d).

At block 275, process 255 verifies whether the user attempting to upload the digital content has the appropriate rights to do so. For example, process 255 can compare a user identifier for the uploading user with the user identifiers/user role combination for the retrieved content-specific watermarking identifier to determine whether the uploading user has the appropriate role to upload the digital content. When process 255 determines that the uploading user does not possess the appropriate rights to upload the digital content, it proceeds to block 290 and notifies that a mismatch error occurred. For example, process 255 can send a notification to the uploading user (via the digital content provider) that he/she does not have the required permissions to upload the digital content to the digital content provider. As an example, when a user associated with identifier 10897 attempts to upload digital content associated with identifier 123456 to digital content provider associated with identifier 2391, process 255 determines that user identifier 10897 only has "subscriber" rights in the digital content and cannot upload the digital content. When process 255 determines that the uploading user does possess the appropriate rights to upload the digital content, it proceeds to block 280. At block 280, process 255 uploads the digital content to the content repository (e.g., content repository 125 in FIG. 1B). In several embodiments, the process performed at blocks 210-225 of FIG. 2A can be performed after block 280.

At block 285, process 255 updates the distributed ledger to reflect that the uploading user has uploaded previously watermarked digital content to a digital content provider. For example, process 255 communicates with the distributed ledger to create entry 340d in the data structure illustrated in FIG. 3B when a user associated with identifier 492 attempts to upload digital content associated with identifier 123456 to digital content provider associated with identifier 560. In several embodiments, the facility enables a user to delete digital content previously uploaded to one or more digital content providers. The facility first verifies that the deleting user has the appropriate rights and permissions to delete the digital content. When the user possesses the appropriate rights and permissions, the facility can delete (or mark for deletion) the digital content from the content repository and update the distributed ledger to reflect the deletion action.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A digital content anti-piracy system for verifying distribution of content over an electronic communications network, comprising:
   at least one memory storing computer-executable instructions; and
   at least one processor configured to access the at least one memory and execute the computer-executable instructions to perform a set of acts, the acts comprising:
      receive, from a digital content provider, digital media content to be uploaded including at least one watermarking identifier, wherein the digital media content is submitted to the digital content provider for uploading by an upload user;
      compare an identity of the upload user with one or more digital rights identities associated with the at least one watermarking identifier to verify that the upload user is authorized to upload the digital media content;
      detect one or more digital rights identities associated with the at least one watermarking identifier;
      in response to determining a match between the one or more rights identities and the identity o the upload user, compute an upload cost of uploading the digital media is content to at least one digital media content server;
      access a user account of the upload user to determine an account balance available to the upload user;
      in response to the account balance of the upload user being greater than or equal to the upload cost, upload the digital media content to the at least one digital media content server;
      in response to the account balance of the upload user being less than the upload cost,
         transmit an insufficient funds message to the upload user; and
      block an upload of the digital media content upon determining a mismatch between the detected one or more digital rights identities and the identity of the upload user.

2. The digital content anti-piracy system of claim 1 wherein the at least one digital media content server is accessible by at least two different digital content providers.

3. The digital content anti-piracy system of claim 1 wherein the upload cost is based on one or more of the following:
   the digital content provider,
   type of the digital media content,
   size of the digital media content, or
   role of the upload user.

4. The digital content anti-piracy system of claim 1 wherein the at least one watermarking identifier includes at least one content-specific identifier based on a type of the digital media content.

5. The digital content anti-piracy system of claim 4 wherein the type of the digital media content is selected from audio, video, text, and image.

6. The digital content anti-piracy system of claim 1 wherein the at least one watermarking identifier includes at least one content-specific identifier based on:
   data representing the digital content provider,
   type of the digital media content,
   size of the digital media content,
   identity of the upload user, or
   location of the upload user.

7. A computer-implemented method for verifying distribution of content over an electronic communications network comprising:
   receiving, from a digital content provider, digital media content to be uploaded including at least one watermarking identifier, wherein the digital media content is submitted to the digital content provider for uploading by an upload user;
   comparing an identity of the upload user with one or more digital rights identities associated with the at least one watermarking identifier to verify that the upload user is authorized to upload the digital media content;
   detecting one or more digital rights identities associated with the at least one watermarking identifier;
   in response to determining a match between the one or more digital rights identities and the identity of the upload user, computing an upload cost of uploading the digital media content to at least one digital media content server;
   accessing a user account of the upload user to determine an account balance available to the upload user;
   in response to the account balance of the upload user being greater than or equal to the upload cost, uploading the digital media content to the at least one digital media content server;
   in response to the account balance of the upload user being less than the upload cost, transmit an insufficient funds message to the upload user; and
   blocking an upload of the digital media content upon determining a mismatch between the detected one or more digital rights identities and the identity of the upload user.

8. The computer-implemented method of claim 7 wherein the at least one digital media content server is accessible by at least two different digital content providers.

9. The computer-implemented method of claim 7 wherein the upload cost is based on one or more of the following:
   the digital content provider,
   type of the digital media content,
   size of the digital media content, or
   role of the upload user.

10. The computer-implemented method of claim 7 wherein the at least one watermarking identifier includes at least one content-specific identifier based on a type of the digital media content, wherein the type of the digital media content is selected from audio, video, text, and image.

11. The computer-implemented method of claim 7 wherein the at least one watermarking identifier includes at least one content-specific identifier is based on:
   data representing the digital content provider,
   type of the digital media content,
   size of the digital media content,
   identity of the upload user, or
   location of the upload user.

12. A non-transitory computer-readable medium storing instructions that, when executed by a computing system, cause the computing system to perform operations verifying distribution of content over an electronic communications network, the operations comprising:
   receiving, from a digital content provider, digital media content to be uploaded including at least one watermarking identifier, wherein the digital media content is submitted to the digital content provider for uploading by an upload user;
   comparing an identity of the upload user with one or more digital rights identities associated with the at least one watermarking identifier to verify that the upload user is authorized to upload the digital media content;
   detecting one or more digital rights identities associated with the at least one watermarking identifier;
   in response to determining a match between the one or more digital rights identities and the identity of the upload user, computing an upload cost of uploading the digital media content to at least one digital media content server;
   accessing a user account of the upload user to determine an account balance available to the upload user;
   in response to the account balance of the upload user being greater than or equal to the upload cost, uploading the digital media content to the at least one digital media content server;
   in response to the account balance of the upload user being less than the upload cost, transmit an insufficient funds message to the upload user; and
   blocking an upload of the digital media content upon determining a mismatch between the one or more digital rights identities and the identity of the upload user.

13. The non-transitory computer-readable medium of claim 12, wherein the at least one digital media content server is accessible by at least two different digital content providers.

14. The non-transitory computer-readable medium of claim 12, wherein the upload cost is based on one or more of the following:
   the digital content provider,
   type of the digital media content,
   size of the digital media content, or
   role of the upload user.

15. The non-transitory computer-readable medium of claim 12, wherein the at least one watermarking identifier includes at least one content-specific identifier based on a type of the digital media content, wherein the type of the digital media content is selected from audio, video, text, and image.

16. The non-transitory computer-readable medium of claim 12, wherein the at least one watermarking identifier includes at least one content-specific identifier is based on:
   data representing the digital content provider,
   type of the digital media content,
   size of the digital media content,
   identity of the upload user, or
   location of the upload user.

17. The non-transitory computer-readable medium of claim 12, wherein the digital media content is associated with information that includes:
   digital media content identifier,
   digital media content type,
   contents of the digital media content,
   hash value of at least part of the digital media content,
   hash value of the digital media content identifier,
   digital media content upload timestamp,
   digital media content creation timestamp,
   digital media content editing timestamp,
   at least one user and user role associated with the digital media content,
   or any combination thereof.

18. The non-transitory computer-readable medium of claim 12, wherein the operations further comprise:
   determining whether the digital media content is associated with the at least one watermarking identifier by examining the digital media content.

* * * * *

UNITED STATES PATENT AND TRADEMARK OFFICE
CERTIFICATE OF CORRECTION

PATENT NO. : 11,934,497 B2  
APPLICATION NO. : 18/174506  
DATED : March 19, 2024  
INVENTOR(S) : Mohammed Artin Smaiely et al.

Page 1 of 1

It is certified that error appears in the above-identified patent and that said Letters Patent is hereby corrected as shown below:

In the Claims

Claim 1, Line 54, after "more" insert --digital--;
       Line 54, after "identity" delete "o" and insert --of--;
       Line 56, after "media" delete "is".

Signed and Sealed this  
Twenty-third Day of April, 2024

Katherine Kelly Vidal  
*Director of the United States Patent and Trademark Office*